(12) United States Patent
Valois (10) Patent No.: US 9,420,665 B2
(45) Date of Patent: Aug. 16, 2016

(54) SYSTEMS AND METHODS FOR CONTINUOUS ADJUSTMENT OF REFERENCE SIGNAL TO CONTROL CHIP

(71) Applicant: I2SYSTEMS INC, Morris, CT (US)

(72) Inventor: Charles Valois, Westford, MA (US)

(73) Assignee: Integration Illumination Systems, Inc., Morris, CT (US)

( * ) Notice: Subject to any disclaimer, the term of this patent is extended or adjusted under 35 U.S.C. 154(b) by 369 days.

(21) Appl. No.: 13/729,770

(22) Filed: Dec. 28, 2012

(65) Prior Publication Data

US 2014/0184127 A1    Jul. 3, 2014

(51) Int. Cl.
*H05B 37/02* (2006.01)
*H05B 33/08* (2006.01)

(52) U.S. Cl.
CPC ............ *H05B 37/02* (2013.01); *H05B 33/0845* (2013.01); *H05B 33/0848* (2013.01); *Y10T 307/406* (2015.04)

(58) Field of Classification Search
CPC ...... H05B 33/0833; H05B 37/02; G05F 1/10; H02P 29/00
USPC ........................................................ 315/312
See application file for complete search history.

(56) References Cited

U.S. PATENT DOCUMENTS

| | | | |
|---|---|---|---|
| 4,139,770 A | 2/1979 | Beyersdorf | |
| 5,264,997 A | 11/1993 | Hutchisson et al. | |
| 5,465,199 A | 11/1995 | Bray et al. | |
| 5,561,346 A | 10/1996 | Byrne | |
| 5,659,582 A | 8/1997 | Kojima et al. | |
| 5,783,909 A | 7/1998 | Hochstein | |
| 5,803,579 A | 9/1998 | Turnbull et al. | |
| 5,909,429 A | 6/1999 | Satyanarayana et al. | |
| 5,947,587 A | 9/1999 | Keuper et al. | |
| 6,013,988 A | 1/2000 | Bucks et al. | |
| 6,016,038 A | 1/2000 | Mueller et al. | |
| 6,040,663 A | 3/2000 | Bucks et al. | |
| 6,094,014 A | 7/2000 | Bucks et al. | |
| 6,127,783 A | 10/2000 | Pashley et al. | |
| 6,147,458 A | 11/2000 | Bucks et al. | |

(Continued)

FOREIGN PATENT DOCUMENTS

WO    WO-03/017733 A1    2/2003

OTHER PUBLICATIONS

"1-Wire Products Deliver a Powerful Combination . . . ", Mixed-Signal Design Guide, Dallas Semiconductor Maxim, 2005, 7 pages.

(Continued)

*Primary Examiner* — Douglas W Owens
*Assistant Examiner* — Pedro C Fernandez
(74) *Attorney, Agent, or Firm* — Foley & Lardner LLP; Christopher J. McKenna (57) ABSTRACT

The present solution provides continuous adjustment of a reference signal to a control chip to facilitate controlling the average output power. In some aspects, a system may facilitate continuous adjustment of power provided to a device by providing a reference signal with a slope to a control pin (e.g., current control pin) of a control chip (e.g., power regulator or LED driver). Providing a reference signal with a slope (e.g., a triangle or a sinusoidal wave) can increase the control range of the control chip and improve control chip performance. For example, systems and methods of the present disclosure may increase the dimming range of an LED from less than 0.1% to 100%.

19 Claims, 6 Drawing Sheets

(56) References Cited

U.S. PATENT DOCUMENTS

| | | |
|---|---|---|
| 6,150,774 A | 11/2000 | Mueller et al. |
| 6,157,093 A | 12/2000 | Giannopoulos et al. |
| 6,166,496 A | 12/2000 | Lys et al. |
| 6,194,839 B1 | 2/2001 | Chang |
| 6,201,353 B1 | 3/2001 | Chang et al. |
| 6,211,626 B1 | 4/2001 | Lys et al. |
| 6,234,645 B1 | 5/2001 | Borner et al. |
| 6,234,648 B1 | 5/2001 | Borner et al. |
| 6,236,331 B1 | 5/2001 | Dussureault |
| 6,238,065 B1 | 5/2001 | Jones |
| 6,249,088 B1 | 6/2001 | Chang |
| 6,250,774 B1 | 6/2001 | Begemann et al. |
| 6,253,530 B1 | 7/2001 | Price et al. |
| 6,288,497 B1 | 9/2001 | Chang et al. |
| 6,292,901 B1 | 9/2001 | Lys et al. |
| 6,299,329 B1 | 10/2001 | Mui et al. |
| 6,304,464 B1 | 10/2001 | Jacobs et al. |
| 6,305,818 B1 | 10/2001 | Lebens et al. |
| 6,340,864 B1 | 1/2002 | Wacyk |
| 6,340,868 B1 | 1/2002 | Lys et al. |
| 6,384,545 B1 | 5/2002 | Lau |
| 6,411,046 B1 | 6/2002 | Muthu |
| 6,441,558 B1 | 8/2002 | Muthu et al. |
| 6,443,592 B1 | 9/2002 | Unger et al. |
| 6,445,139 B1 | 9/2002 | Marshall et al. |
| 6,459,919 B1 | 10/2002 | Lys et al. |
| 6,489,731 B1 | 12/2002 | Bruning et al. |
| 6,495,964 B1 | 12/2002 | Muthu et al. |
| 6,507,158 B1 | 1/2003 | Wang |
| 6,507,159 B2 | 1/2003 | Muthu |
| 6,510,995 B2 | 1/2003 | Muthu et al. |
| 6,513,949 B1 | 2/2003 | Marshall et al. |
| 6,528,954 B1 | 3/2003 | Lys et al. |
| 6,552,495 B1 | 4/2003 | Chang |
| 6,576,881 B2 | 6/2003 | Muthu et al. |
| 6,577,080 B2 | 6/2003 | Lys et al. |
| 6,577,512 B2 | 6/2003 | Tripathi et al. |
| 6,580,309 B2 | 6/2003 | Jacobs et al. |
| 6,586,890 B2 | 7/2003 | Min et al. |
| 6,596,977 B2 | 7/2003 | Muthu et al. |
| 6,608,453 B2 | 8/2003 | Morgan et al. |
| 6,609,813 B1 | 8/2003 | Showers et al. |
| 6,617,795 B2 | 9/2003 | Bruning |
| 6,621,235 B2 | 9/2003 | Chang |
| 6,630,801 B2 | 10/2003 | Schuurmans |
| 6,636,003 B2 | 10/2003 | Rahm et al. |
| 6,639,368 B2 | 10/2003 | Sheoghong |
| 6,676,284 B1 | 1/2004 | Wynne Willson |
| 6,692,136 B2 | 2/2004 | Marshall et al. |
| 6,720,745 B2 | 4/2004 | Lys et al. |
| 6,724,159 B2 | 4/2004 | Gutta et al. |
| 6,734,639 B2 | 5/2004 | Chang et al. |
| 6,741,351 B2 | 5/2004 | Marshall et al. |
| 6,762,562 B2 | 7/2004 | Leong |
| 6,777,891 B2 | 8/2004 | Lys et al. |
| 6,788,011 B2 | 9/2004 | Mueller et al. |
| 6,796,680 B1 | 9/2004 | Showers et al. |
| 6,796,686 B2 | 9/2004 | Jacob et al. |
| 6,801,003 B2 | 10/2004 | Schanberger et al. |
| 6,806,659 B1 | 10/2004 | Mueller et al. |
| 6,831,569 B2 | 12/2004 | Wang et al. |
| 6,853,150 B2 | 2/2005 | Clauberg et al. |
| 6,853,151 B2 | 2/2005 | Leong et al. |
| 6,859,644 B2 | 2/2005 | Wang |
| 6,922,022 B2 | 7/2005 | Bucks et al. |
| 6,930,452 B2 | 8/2005 | De Krijger et al. |
| 6,932,477 B2 | 8/2005 | Stanton |
| 6,933,685 B2 | 8/2005 | Gutta et al. |
| 6,933,767 B2 | 8/2005 | Bucks et al. |
| 6,965,205 B2 | 11/2005 | Piepgras et al. |
| 6,969,954 B2 | 11/2005 | Lys |
| 6,972,525 B2 | 12/2005 | Bucks et al. |
| 6,975,079 B2 | 12/2005 | Lys et al. |
| 6,992,803 B2 | 1/2006 | Chang |
| 6,998,594 B2 | 2/2006 | Gaines et al. |
| 7,014,336 B1 | 3/2006 | Ducharme et al. |
| 7,030,572 B2 | 4/2006 | Nijhof et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,064,498 B2 | 6/2006 | Dowling et al. |
| 7,067,992 B2 | 6/2006 | Leong et al. |
| 7,071,762 B2 | 7/2006 | Xu et al. |
| 7,113,541 B1 | 9/2006 | Lys et al. |
| 7,118,248 B2 | 10/2006 | Wynne Willson |
| 7,132,804 B2 | 11/2006 | Lys et al. |
| 7,135,824 B2 | 11/2006 | Lys et al. |
| 7,139,617 B1 | 11/2006 | Morgan et al. |
| 7,140,752 B2 | 11/2006 | Ashdown |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| 7,186,003 B2 | 3/2007 | Dowling et al. |
| 7,202,608 B2 | 4/2007 | Robinson et al. |
| 7,202,613 B2 | 4/2007 | Morgan et al. |
| 7,202,641 B2 | 4/2007 | Claessens et al. |
| 7,204,622 B2 | 4/2007 | Dowling et al. |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,242,152 B2 | 7/2007 | Dowling et al. |
| 7,253,566 B2 | 8/2007 | Lys et al. |
| 7,255,457 B2 | 8/2007 | Ducharme et al. |
| 7,255,458 B2 | 8/2007 | Ashdown |
| 7,256,554 B2 | 8/2007 | Lys |
| 7,262,559 B2 | 8/2007 | Tripathi et al. |
| 7,267,461 B2 | 9/2007 | Kan et al. |
| 7,274,160 B2 | 9/2007 | Mueller et al. |
| 7,276,861 B1 * | 10/2007 | Shteynberg et al. .......... 315/291 |
| 7,300,192 B2 | 11/2007 | Mueller et al. |
| 7,308,296 B2 | 12/2007 | Lys et al. |
| 7,309,965 B2 | 12/2007 | Dowling et al. |
| 7,314,289 B2 | 1/2008 | Montagne |
| 7,319,298 B2 | 1/2008 | Jungwirth et al. |
| 7,323,676 B2 | 1/2008 | Duijve |
| 7,329,998 B2 | 2/2008 | Jungwirth |
| 7,350,936 B2 | 4/2008 | Ducharme et al. |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,354,172 B2 | 4/2008 | Chemel et al. |
| 7,358,679 B2 | 4/2008 | Lys et al. |
| 7,358,681 B2 | 4/2008 | Robinson et al. |
| 7,358,706 B2 | 4/2008 | Lys |
| 7,358,929 B2 | 4/2008 | Mueller et al. |
| 7,358,961 B2 | 4/2008 | Zwanenburg |
| 7,387,405 B2 | 6/2008 | Ducharme et al. |
| 7,388,665 B2 | 6/2008 | Ashdown |
| 7,394,210 B2 | 7/2008 | Ashdown |
| 7,420,335 B2 | 9/2008 | Robinson et al. |
| 7,423,387 B2 | 9/2008 | Robinson et al. |
| 7,432,668 B2 | 10/2008 | Zwanenburg et al. |
| 7,443,209 B2 | 10/2008 | Chang |
| 7,449,847 B2 | 11/2008 | Schanberger et al. |
| 7,453,217 B2 | 11/2008 | Lys et al. |
| 7,459,864 B2 | 12/2008 | Lys |
| 7,462,997 B2 | 12/2008 | Mueller et al. |
| 7,463,070 B2 | 12/2008 | Wessels |
| 7,482,565 B2 | 1/2009 | Morgan et al. |
| 7,482,760 B2 | 1/2009 | Jungwirth et al. |
| 7,490,953 B2 | 2/2009 | Holten et al. |
| 7,490,957 B2 | 2/2009 | Leong et al. |
| 7,495,671 B2 | 2/2009 | Chemel et al. |
| 7,502,034 B2 | 3/2009 | Chemel et al. |
| 7,505,395 B2 | 3/2009 | Ashdown et al. |
| 7,507,001 B2 | 3/2009 | Kit |
| 7,511,436 B2 | 3/2009 | Xu |
| 7,511,437 B2 | 3/2009 | Lys et al. |
| 7,515,128 B2 | 4/2009 | Dowling |
| 7,520,634 B2 | 4/2009 | Ducharme et al. |

(56) References Cited

U.S. PATENT DOCUMENTS

| | | |
|---|---|---|
| 7,521,872 B2 | 4/2009 | Bruning |
| 7,525,254 B2 | 4/2009 | Lys et al. |
| 7,538,499 B2 | 5/2009 | Ashdown |
| 7,542,257 B2 | 6/2009 | McCormick et al. |
| 7,550,931 B2 | 6/2009 | Lys et al. |
| 7,550,935 B2 | 6/2009 | Lys et al. |
| 7,557,521 B2 | 7/2009 | Lys |
| 7,569,807 B2 | 8/2009 | Matheson |
| 7,572,028 B2 | 8/2009 | Mueller et al. |
| 7,573,209 B2 | 8/2009 | Ashdown et al. |
| 7,573,210 B2 | 8/2009 | Ashdown et al. |
| 7,573,729 B2 | 8/2009 | Elferich et al. |
| 7,598,681 B2 | 10/2009 | Lys et al. |
| 7,598,684 B2 | 10/2009 | Lys et al. |
| 7,598,686 B2 | 10/2009 | Lys et al. |
| 7,619,370 B2 | 11/2009 | Chemel et al. |
| 7,652,236 B2 | 1/2010 | Cortenraad et al. |
| 7,654,703 B2 | 2/2010 | Kan et al. |
| 7,656,366 B2 | 2/2010 | Ashdown |
| 7,658,506 B2 | 2/2010 | Dowling |
| 7,659,673 B2 | 2/2010 | Lys |
| 7,659,674 B2 | 2/2010 | Mueller et al. |
| 7,665,883 B2 | 2/2010 | Matheson |
| 7,667,409 B2 | 2/2010 | Geerts et al. |
| 7,675,238 B2 | 3/2010 | Cortenraad et al. |
| 7,687,753 B2 | 3/2010 | Ashdown |
| 7,688,002 B2 | 3/2010 | Ashdown et al. |
| 7,689,130 B2 | 3/2010 | Ashdown |
| 7,703,951 B2 | 4/2010 | Piepgras et al. |
| 7,710,369 B2 | 5/2010 | Dowling |
| 7,712,926 B2 | 5/2010 | Matheson |
| 7,714,521 B2 | 5/2010 | Qian |
| 7,731,387 B2 | 6/2010 | Cortenraad et al. |
| 7,731,389 B2 | 6/2010 | Draganov et al. |
| 7,731,390 B2 | 6/2010 | Van Gorkom et al. |
| 7,737,643 B2 | 6/2010 | Lys |
| 7,738,002 B2 | 6/2010 | Ashdown et al. |
| 7,740,375 B2 | 6/2010 | Zou et al. |
| 7,766,489 B2 | 8/2010 | Duine et al. |
| 7,766,518 B2 | 8/2010 | Piepgras et al. |
| 7,772,787 B2 | 8/2010 | Ashdown et al. |
| 7,777,427 B2 | 8/2010 | Stalker, III |
| 7,781,979 B2 | 8/2010 | Lys |
| 7,802,902 B2 | 9/2010 | Moss et al. |
| 7,806,558 B2 | 10/2010 | Williamson |
| 7,808,191 B2 | 10/2010 | Wu |
| 7,809,448 B2 | 10/2010 | Lys et al. |
| 7,810,974 B2 | 10/2010 | Van Rijswick et al. |
| 7,845,823 B2 | 12/2010 | Mueller et al. |
| 7,850,347 B2 | 12/2010 | Speier et al. |
| 7,854,539 B2 | 12/2010 | Van Duijneveldt |
| 7,868,562 B2 | 1/2011 | Salsbury et al. |
| 7,878,683 B2 | 2/2011 | Logan et al. |
| 7,878,688 B2 | 2/2011 | Paulussen et al. |
| 7,893,631 B2 | 2/2011 | Speier |
| 7,893,661 B2 | 2/2011 | Ackermann et al. |
| 7,894,050 B2 | 2/2011 | Ashdown et al. |
| 7,906,917 B2 | 3/2011 | Tripathi et al. |
| 7,911,151 B2 | 3/2011 | Xu |
| 7,914,173 B2 | 3/2011 | Paulussen et al. |
| 8,022,632 B2 | 9/2011 | Schulz et al. |
| 8,026,673 B2 | 9/2011 | Lys |
| 2002/0074559 A1 | 6/2002 | Dowling et al. |
| 2003/0132721 A1 | 7/2003 | Jacobs et al. |
| 2003/0133292 A1 | 7/2003 | Mueller et al. |
| 2004/0052076 A1 | 3/2004 | Mueller et al. |
| 2004/0090191 A1 | 5/2004 | Mueller et al. |
| 2004/0178751 A1 | 9/2004 | Mueller et al. |
| 2005/0236998 A1 | 10/2005 | Mueller et al. |
| 2005/0275626 A1 | 12/2005 | Mueller et al. |
| 2006/0002110 A1 | 1/2006 | Dowling et al. |
| 2006/0076908 A1 | 4/2006 | Morgan et al. |
| 2006/0114201 A1 | 6/2006 | Chang |
| 2006/0152172 A9 | 7/2006 | Mueller et al. |
| 2006/0221606 A1 | 10/2006 | Dowling |
| 2006/0262521 A1 | 11/2006 | Piepgras et al. |
| 2006/0274526 A1 | 12/2006 | Weston et al. |
| 2006/0290624 A1 | 12/2006 | Ashdown |
| 2007/0063658 A1 | 3/2007 | Van Der Veeken |
| 2007/0086912 A1 | 4/2007 | Dowling et al. |
| 2007/0115658 A1 | 5/2007 | Mueller et al. |
| 2007/0145915 A1 | 6/2007 | Roberge et al. |
| 2007/0153514 A1 | 7/2007 | Dowling et al. |
| 2007/0230159 A1 | 10/2007 | Cortenraad et al. |
| 2007/0258240 A1 | 11/2007 | Ducharme et al. |
| 2007/0273290 A1 | 11/2007 | Ashdown et al. |
| 2008/0042599 A1 | 2/2008 | Ashdown |
| 2008/0043464 A1 | 2/2008 | Ashdown |
| 2008/0048582 A1 | 2/2008 | Robinson |
| 2008/0062413 A1 | 3/2008 | Ashdown et al. |
| 2008/0089060 A1 | 4/2008 | Kondo et al. |
| 2008/0094005 A1 | 4/2008 | Rabiner et al. |
| 2008/0122386 A1 | 5/2008 | De Brouwer et al. |
| 2008/0136331 A1 | 6/2008 | Schmeikal |
| 2008/0136796 A1 | 6/2008 | Dowling |
| 2008/0140231 A1 | 6/2008 | Blackwell et al. |
| 2008/0164826 A1 | 7/2008 | Lys |
| 2008/0164854 A1 | 7/2008 | Lys |
| 2008/0167734 A1 | 7/2008 | Robinson et al. |
| 2008/0183081 A1 | 7/2008 | Lys et al. |
| 2008/0239675 A1 | 10/2008 | Speier |
| 2008/0265797 A1 | 10/2008 | Van Doorn |
| 2008/0278092 A1 | 11/2008 | Lys et al. |
| 2008/0278941 A1 | 11/2008 | Logan et al. |
| 2008/0290251 A1 | 11/2008 | Deurenberg et al. |
| 2008/0297066 A1 | 12/2008 | Meijer et al. |
| 2008/0298330 A1 | 12/2008 | Leitch |
| 2008/0315798 A1 | 12/2008 | Diederiks et al. |
| 2009/0002981 A1 | 1/2009 | Knibbe |
| 2009/0021175 A1 | 1/2009 | Wendt et al. |
| 2009/0021182 A1 | 1/2009 | Sauerlaender |
| 2009/0072761 A1 | 3/2009 | Wessels |
| 2009/0128059 A1 | 5/2009 | Joosen et al. |
| 2009/0134817 A1 | 5/2009 | Jurngwirth et al. |
| 2009/0160364 A1 | 6/2009 | Ackermann et al. |
| 2009/0160369 A1* | 6/2009 | Godbole et al. ............. 315/307 |
| 2009/0168415 A1 | 7/2009 | Franciscus Deurenberg et al. |
| 2009/0179587 A1 | 7/2009 | Van Der Veen et al. |
| 2009/0179596 A1 | 7/2009 | Willaert et al. |
| 2009/0184662 A1* | 7/2009 | Given et al. ................... 315/294 |
| 2009/0189448 A1 | 7/2009 | Verschueren |
| 2009/0224695 A1 | 9/2009 | Van Erp et al. |
| 2009/0230884 A1 | 9/2009 | Van Doorn |
| 2009/0243507 A1 | 10/2009 | Lucero-Vera et al. |
| 2009/0278473 A1 | 11/2009 | Van Erp |
| 2009/0284174 A1 | 11/2009 | Sauerlander et al. |
| 2009/0321666 A1 | 12/2009 | Hilgers |
| 2010/0007600 A1 | 1/2010 | Deurenberg et al. |
| 2010/0026191 A1 | 2/2010 | Radermacher et al. |
| 2010/0045478 A1 | 2/2010 | Schulz et al. |
| 2010/0072901 A1 | 3/2010 | De Rijck et al. |
| 2010/0072902 A1 | 3/2010 | Wendt et al. |
| 2010/0079085 A1 | 4/2010 | Wendt et al. |
| 2010/0079091 A1 | 4/2010 | Deixler et al. |
| 2010/0084995 A1 | 4/2010 | Baaijens et al. |
| 2010/0091488 A1 | 4/2010 | Ijzerman et al. |
| 2010/0094439 A1 | 4/2010 | Van De Meulenhof et al. |
| 2010/0102732 A1 | 4/2010 | Peeters et al. |
| 2010/0117543 A1 | 5/2010 | Van Der Veen et al. |
| 2010/0117656 A1 | 5/2010 | Snelten |
| 2010/0118531 A1 | 5/2010 | Montagne |
| 2010/0127633 A1 | 5/2010 | Geerts et al. |
| 2010/0134041 A1 | 6/2010 | Radermacher et al. |
| 2010/0134042 A1 | 6/2010 | Willaert |
| 2010/0148689 A1 | 6/2010 | Morgan et al. |
| 2010/0164399 A1 | 7/2010 | Radermacher et al. |
| 2010/0165618 A1 | 7/2010 | Vissenberg et al. |
| 2010/0171771 A1 | 7/2010 | Otte et al. |
| 2010/0181936 A1 | 7/2010 | Radermacher et al. |
| 2010/0188007 A1 | 7/2010 | Deppe et al. |
| 2010/0194293 A1 | 8/2010 | Deurenberg et al. |
| 2010/0231133 A1 | 9/2010 | Lys |
| 2010/0231363 A1 | 9/2010 | Knibbe |
| 2010/0244707 A1 | 9/2010 | Gaines et al. |

(56) References Cited

U.S. PATENT DOCUMENTS

| | | |
|---|---|---|
| 2010/0244734 A1 | 9/2010 | Van Herpen et al. |
| 2010/0259182 A1 | 10/2010 | Man et al. |
| 2010/0264834 A1 | 10/2010 | Gaines et al. |
| 2010/0271843 A1 | 10/2010 | Holten et al. |
| 2010/0289532 A1 | 11/2010 | Wendt et al. |
| 2010/0301780 A1 | 12/2010 | Vinkenvleugel |
| 2010/0308745 A1 | 12/2010 | Delnoij |
| 2011/0025205 A1 | 2/2011 | Van Rijswick et al. |
| 2011/0025230 A1 | 2/2011 | Schulz et al. |
| 2011/0035404 A1 | 2/2011 | Morgan et al. |
| 2011/0042554 A1 | 2/2011 | Hilgers et al. |
| 2011/0090684 A1 | 4/2011 | Logan et al. |
| 2011/0095694 A1 | 4/2011 | Justel et al. |
| 2011/0140620 A1* | 6/2011 | Lin et al. ............ 315/224 |
| 2011/0140626 A1* | 6/2011 | Aurongzeb ...... H05B 33/0845 315/250 |
| 2011/0285292 A1 | 11/2011 | Mollnow et al. |
| 2011/0291812 A1 | 12/2011 | Verbrugh |
| 2012/0019670 A1 | 1/2012 | Chang et al. |
| 2012/0230073 A1* | 9/2012 | Newman et al. ....... 363/126 |
| 2013/0049621 A1* | 2/2013 | Yan et al. ............ 315/205 |
| 2013/0241441 A1* | 9/2013 | Myers et al. .......... 315/307 |

OTHER PUBLICATIONS

"Conductivity with the BS2/OWL2", EME Systems, 2002, pp. 1-3.
"Dimmable Fluorescent Ballast", ATAVRFBKIT/EVLB001, User Guide, ATMEL, 2007, pp. 1-33.
"High-side current sensing for driving a string of white LEDs", EDN, 1 page.
"Understanding Boost Power Stages in Switchmode Power Supplies", Application Report, Texas Instruments, Mixed Signal Products, Mar. 1999, pp. 1-28.
"Understanding Buck Power Stages in Switchmode Power Supplies", Application Report, Texas Instruments, Mixed Signal Products, Mar. 1999, pp. 1-32.
Barberis, C. "Precision current sink costs less than $20", EDN Design Ideas.
Bellcomb Technologies Incoporated, "Edges, Joiners, Attachments", Web Address: http://www.bellcomb.com/caps/edges.htm, Apr. 22, 2007, pp. 1-3.
Bookmarks Menu—Controllers/Wireless—Deisgn Ideas, dated Dec. 6, 2012, 1 pg.
Bowling, S. "Buck-Boost LED Driver Using the PIC16F785 MCU", Microchip, AN1047, 2006, pp. 1-12.
By Staff, Dali Delivers Control and Cost Savings, Headaches Too, Consulting-Specifying Engineer, Jun. 2002, 2 pages.
Canny, D. "Controlling slew times tames EMI in offline supplies", EDN Design Ideas, Nov. 14, 2002.
Control Freak Addict Data Sheet, Copyright 2008, Creative Lighting, 5 pages.
Curtis, K. "High Power IR LED Driver Using the PIC16C781/782", Microchip, TB062, 2002, pp. 1-8.
CybroTech, Managing Lights with Pali, TN-012, rev 2, Cybrotech Ltd., 2007, 11 pgs.
Cypress Perform, Implementing an Integrated DMX512 Receiver, Item ID: 39762, Dec. 16 2009, 1 pg.
Cypress Semiconductor Corporation, PowerPSoC (R) Intelligent LED Driver, Document No. 001-46319, Rev. *G, 2009.
Dali-AG website, Dali at work, 1 pg.
Davidovic, et al., Lead-Acid Battery Charger Becomes a Subfuction in a Microcontroller, The Authority on Emerging Technologies for Design Solutions, Mar. 2007, 2 pages.
Davmark Ltd., Dali-Protocol, 2007, 6 pages.
Di Jasio, "A Technique to Increase the Frequency Resolution of PICmicro MCU PWM Modules", Microchip, AN1050, 2006, pp. 1-10.
Dietz, et al. "Very Low-Cost Sensing and Communication Using Bidirectional LEDs", Mitsubishi Electric Research Laboratories, Jul. 2003, 19 pgs.

Distler, T. "LED Effects Stream TM v2.0 Protocol (Revision C)", Jun. 2, 2005, pp. 1-5.
Dunn, J. "Matching MOSFET Drivers to MOSEFTs", Microchip, AN799, 2004, pp. 1-10.
Fosler, R. "The RS-232/DALI Bridge Interface", Microchip, AN811, 2002, pp. 1-8.
Fosler, R. "Use a microcontroller to design a boost converter", EDN design ideas, Mar. 4, 2004, pp. 74-75.
Fosler, R., et al. "Digitally Addressable DALI Dimming Ballast", Microchip, AN809, 2002, pp. 1-18.
Ghulyani, L. "Simple MPPT-Based Lead Acid Charger Using bq2031", Texas Instruments, Dec. 2009, pp. 1-5.
Google Search Results for dali query group, search completed on Apr. 8, 2010, accessed at google.com, http://www.google.com/search?hl=en&client=firefox-a&rls=org.mozilla:en-, 2 pages.
Hardwick, M. "DC power wire also carries clock or data", EDN Design Ideas.
Hexcel Composites, "Sandwich Panel Fabrication Technology", Web Address: http://www.hexcel.com/NR/rdonlyres/B4574C2C-0644-43AC-96E2-CC15967A4b)5/4547 Sandwich Fabrication.pdf, Jan. 1997, pp. 1-16.
High-Side Current Monitor, Zetex, Apr. 2001, ZXCT1009, Issue 3, pp. 1-8.
Implementing Infrared Object Detection, http://web.archive.org/web/20080528042614rejwww.seattlerobotics.org/guide/infrared.html, original publication date known, retrieved Apr. 7, 2010, seattlerobotics.org, 4 pages.
Jackson, S. "Circuit protects bus from 5V swings", EDN Design Ideas, Nov. 14, 2002.
Klepin, K. "Temperature Compensation for High Brightness LEDs using EZ-Color (TM) and PSoC Express", Cypress Perform, AN14406, Aug. 10, 2007, pp. 1-4.
Kremin, V. et al. "Multichannel LED Dimmer with CapSense Control—AN13943", Cypress Perform, Jul. 20, 2007.
Kropf, B. "Firmware—RGB Color Mixing Firmware for EZ-Color (TM)—AN16035", Cypress Perform, Jun. 13, 2007, pp. 1-7.
Lager, A. "Use a 555 timer as a switch-mode power supply", EDN Design Ideas, Nov. 14, 2002.
Lee, M. Shunt Battery Charger Provides 1A Continuous Current, EDN Magazine, 1997.
Locher, R. "Introduction to Power MOSEFETs and their Applications", Fairchild Semiconductor (TM), Application Note 558, Rev.B, Oct. 1998, 15 pgs.
Miller, R. "Digital addressable lighting interface protocol fosters systems interoperability for lower costs and greater design flexibility", RNM Engineering, Inc., Apr. 2003, pp. 1-20.
Nell, S. "VCO uses programmable logic", EDN Design Ideas, Nov. 14, 2002.
News & Events DALI Digital addressable lighting interface lamp luminaire control, accessed at http://www.dali-ag.org/ on Apr. 8, 2010, original publication date unknown, updated Apr. 8, 2010, 1 pg.
O'Loughlin, M. "350-W, Two-Phase Interleaved PFC Pre-regulator Design Review", Texas Instruments, Application Report, Revised Mar. 2007, pp. 1-.
O'Loughlin, M., PFC Pre-Regulator Frequency Dithering Circuit, Texas Instruments, May 2007, pp. 1-8.
Perrin, R. Inexpensive Relays Form Digital Potentiometer, EDN Design Ideas, 1998, 2 pages.
Petersen, A. "Harness solar power with smart power-conversion techniques", EDN, Green Electronics designfeature, Feb. 4, 1999, pp. 119-124.
Prendergast, P. "How to Design a Three-Channel LED Driver", Cypress Perform, Jan. 2008, pp. 1-9.
Renesas, R8C/25 Demonstration Example for DALI Lighting Protocol Stack, REU05BOO77-0100/Rev. 1.00, Jul. 2008, 14 pgs.
Richardson, C., Matching Driver to LED, National Semiconductor, Jan. 2008, 5 pgs.
Richardson. C., LM3404 Driving a Seoul Semi Zpower P4 1A LED-RD-I34, National Semiconductor, Apr. 2007, 6 pages.
Shanmugam, S. "Design of a linear Fresnel lens system for solar photovoltaic electrical power source", Center for Robotics Research.
Shill, M. "Simple logic probe uses bicolor LED", EDN Design Ideas.

(56) References Cited

OTHER PUBLICATIONS

Software Design Specification, Z-Wave Protocol Overview, Z wave the wireless language, Zensys A/S, May 9, 2007, pp. 1-16.
Soundlight, Operating Manual, DALI and DMX Dekoder 7064A-H Mk1, 2008, 8 pgs.
Takahashi A., Methods and Features of LED Drivers, National Semiconductor, Mar. 2008, 3 pgs.
Universal Powerline Bus Communication Technology, Overview, PCS Powerline Control Systems UPB (Universal Powerline Bus), Jan. 8, 2002, pp. 1-13.
UPB Technology Description, PCS—Powerline Control Systems, UPB (Universal Powerline Bus), Version 1.4, Apr. 16, 2007, 68 pages.
Use Gate Charge to Design the Gate Drive Circuit for Power MOSEFETs and IGBTs, International Rectifier, Application Note AN-944, 5 pgs.
Van Dorsten, Arian, A Low Cost Step-up Converter by IC 555, posted Jul. 21, 2007, http://www.eleccircuit.comla-low-cost-step-up-converter-by-ic-5551, retrieved Apr. 7, 2010, 2 pages.
Walma, K., Dali: Forerunner of Today's Breakthrough Lighting Technology, Feb. 2007, 2 pages.
Wikipedia, Digital Addressable Lighting Interface, original publication date unknown, Retrieved from:Retrieved from "http://en.wikipedia.org/wikiJDigital_Addressable_Lighting_Interface" accessed on Apr. 8, 2010, 3 pages.
Witt, J. "Switched-capacitor regulator provides gain", EDN Design Ideas.
Wojslaw, C. "DPP adds versatility to VFC", EDN, design ideas, Nov. 14, 2002, pp. 99-110.
Young, R. "Power circuit terminates DDR DRAMs", EDN Design Ideas, Nov. 14, 2002.
Zarr, R. Driving High-Power LEDs, Machine Design, Oct. 2007, 3 pages.
Zensys ASCII Interface, Vizia, 2007.
Z-Wave Vizia Etc thread, retrieved at http://groups.google.com/group/comp.home.automation/browse_thread/thread/449c2c66934dfSfb/fSI12116a8231aa1?lnk=st&q=z-wave&rnum=98#fSI12116a8231aa1, www.ztech.com, 18 pages.

* cited by examiner

SYSTEMS AND METHODS FOR CONTINUOUS ADJUSTMENT OF REFERENCE SIGNAL TO CONTROL CHIP

FIELD OF THE INVENTION

The present application is generally related to providing a continuously adjusted reference signal to a control chip.

BACKGROUND

The intensity level of a light emitting diode (LED) may be reduced using duty-cycle adjustment (e.g., pulse width modulation or "PWM") as an on/off signal to an on/off input of an LED driver driving the LED. Varying the duty cycle of the signal being input to the on/off input of the LED driver may turn the LED driver on/off for a percentage of time, thus lower the average power provided to the LED.

SUMMARY

The present disclosure is directed to systems and methods for managing the average power supplied to a device. In some aspects, the system may facilitate continuous adjustment of power provided to a device by providing a reference signal having a slope to a control pin (e.g., current control pin) of a control chip (e.g., power regulator or LED driver). Providing a reference signal with a slope (e.g., a triangle or a sinusoidal wave) can increase the control range of the control chip and improve control chip performance. For example, providing a relatively slow changing signal to an LED driver may facilitate smooth control of the current provided to an LED. Smooth control of the current may facilitate controlling surge currents on supply wires or reduce the frequency of harmonics generated by the wires.

In some embodiments, the system includes a power regulator that provides power to a device. The power regulator can include a first output that is coupled to a power input of the device, and be configured to control one of a voltage or a current provided to the device. The system can include a wave shape generator having an output coupled to a control input of the power regulator. The wave shape generator can be configured to generate a wave with a wave shape having a slope. The wave may also include a first portion that is above a minimum threshold that turns on the power regulator. The power regulator can control an intensity level of the device based on the wave shape and the first portion of the wave.

In some embodiments, the wave includes a second portion that is below the minimum threshold to turn off the power regulator. The power regulator can be configured to reduce the intensity level of the device responsive to the second portion of the wave that is below the minimum threshold to turn off the power regulator. In some embodiments, the power regulator, responsive to the second portion of the wave, can stop sending current to the device.

In some embodiments, the wave shape includes a voltage changing slower than the rise-time of the wave. In some embodiments, at least one of the slope, first portion, and second portion is predetermined based on a desired intensity level.

In some embodiments, the control input of the power regulator includes a current control input. In some embodiments, the system includes a current feedback output coupled to the control input of the power regulator, where a signal of the current feedback output is summed with the wave.

In some embodiments, the power regulator includes a light emitting diode (LED) driver, the device includes an LED, and the intensity level includes a dimming level of the LED. In some embodiments, the device includes an electric motor.

In some embodiments, the wave shape generator is configured to generate at least one of a triangle wave and a sine wave. In some embodiments, the wave shape generator includes a digital-to-analog convertor configured to generate the wave shape with multiple steps.

In some embodiments, the wave shape generator can include an interface. The wave shape generator can be configured to receive a wave from a wave source and condition the received wave such that the conditioned wave includes a slope. In some embodiments, the interface is configured to round at least one edge of the received wave. The interface can include at least one of: a transistor push-pull with a resistor and capacitor; a transistor push up with a resistor pull-down with a resistor and capacitor; a constant-current source and constant-current sink with a capacitor; a constant-current source with a resistor pull-down with a capacitor; a constant-current sink with a resistor pull-up with a capacitor; an inductor; and a capacitor.

In some embodiments, the system is configured to control the intensity level of the device from 1% to 100%. In some embodiments, the system is configured to control the intensity level of the device from 0.1% to 100%.

In some embodiments, the system includes multiple power regulators and devices. For example, a first power regulator may be coupled to a first device and a second power regulator may be coupled to a second device. The output of the wave shape generator may be coupled to the control input of the first power regulator and the second power regulator. In some embodiments, a third device is coupled to the first device and first power regulator in series, and a fourth device is coupled to the second device and the second power regulator in series.

In some embodiments, the system includes a direct current (DC) source coupled to the control input. The DC source can be configured to move the second portion of the wave above the minimum threshold In one aspect, the present disclosure is directed to a system for managing a light emitting diode (LED). In some embodiments, the system includes a wave shape generator in communication with a dimming controller. The wave shape generator can receive an indication of a desired dimming level for the LED. The wave shape generator may receive the desired dimming level from the dimming controller. Responsive to the indication, the system can generate a wave. The wave can include a wave shape with a slope, and at least a portion of the wave can be above a threshold. The system can transmit the wave to an LED driver via a current control input of the LED driver. The wave can control a dimming level of the LED.

In one aspect, the present disclosure is directed to a method for managing an LED. The method can include a dimming controller receiving an indication of a desired dimming level for the LED. The method can include generating a wave responsive to the indication. The wave can have a wave shape with a slope, and at least a portion of the wave can be above a threshold to turn on the LED driver. The method can include transmitting the wave to an LED driver via a current control input. The wave can control a dimming level of the LED.

BRIEF DESCRIPTION OF THE DRAWINGS

The foregoing and other objects, aspects, features, and advantages of the present invention will become more apparent and better understood by referring to the following description taken in conjunction with the accompanying drawings, in which.

The features and advantages of the present invention will become more apparent from the detailed description set forth below when taken in conjunction with the drawings, in which like reference characters identify corresponding elements throughout.

DETAILED DESCRIPTION

Apparatus, systems and methods of the present invention provide continuous adjustment of a reference signal to a control chip. The control chip may be coupled to a device and provide power to the device. By continuously adjusting the reference signal to a control chip, the system may facilitate modulating the power provided to the device. In an illustrative example, the control chip may include an LED driver and the device may include an LED. By providing a continuously changing reference signal to the current control pin of an LED driver, such as a wave with a portion that slopes (e.g., a triangle wave or a sinusoidal wave), the system may be configured to reduce the intensity level of an LED to relatively low levels such as, e.g., 1%, 0.5%, or 0.1%. Further to this example, the triangle wave may include a portion that is above a minimum threshold to turn on an LED driver, and the intensity level of the LED may be proportional to the ratio of the area of the wave above the minimum threshold to the area of the wave below the minimum threshold. In another example, the control chip may include a power regulator that regulates voltage or current, and the power regulator may be coupled to a device, such as an electric motor, to manage the power level provided to the device.

In some embodiments, systems and methods of the present disclosure may facilitate reducing flickering of an LED or sputtering of an electric motor. For example, by providing a wave that ramps up and down instead of a wave that steps from a low value to a high value (e.g., a square wave), flicker that may otherwise have been noticeable when the peak-to-peak levels are between two low level currents instead of full on and full off may not be noticeable. Furthermore, and in some embodiments, a minimum threshold to turn on an LED may not need to be identified in advance, or it may drift or vary over time, so long as the wave generated by systems and methods of the present disclosure can have portions above and below the minimum threshold to turn on the LED.

Figure 1:
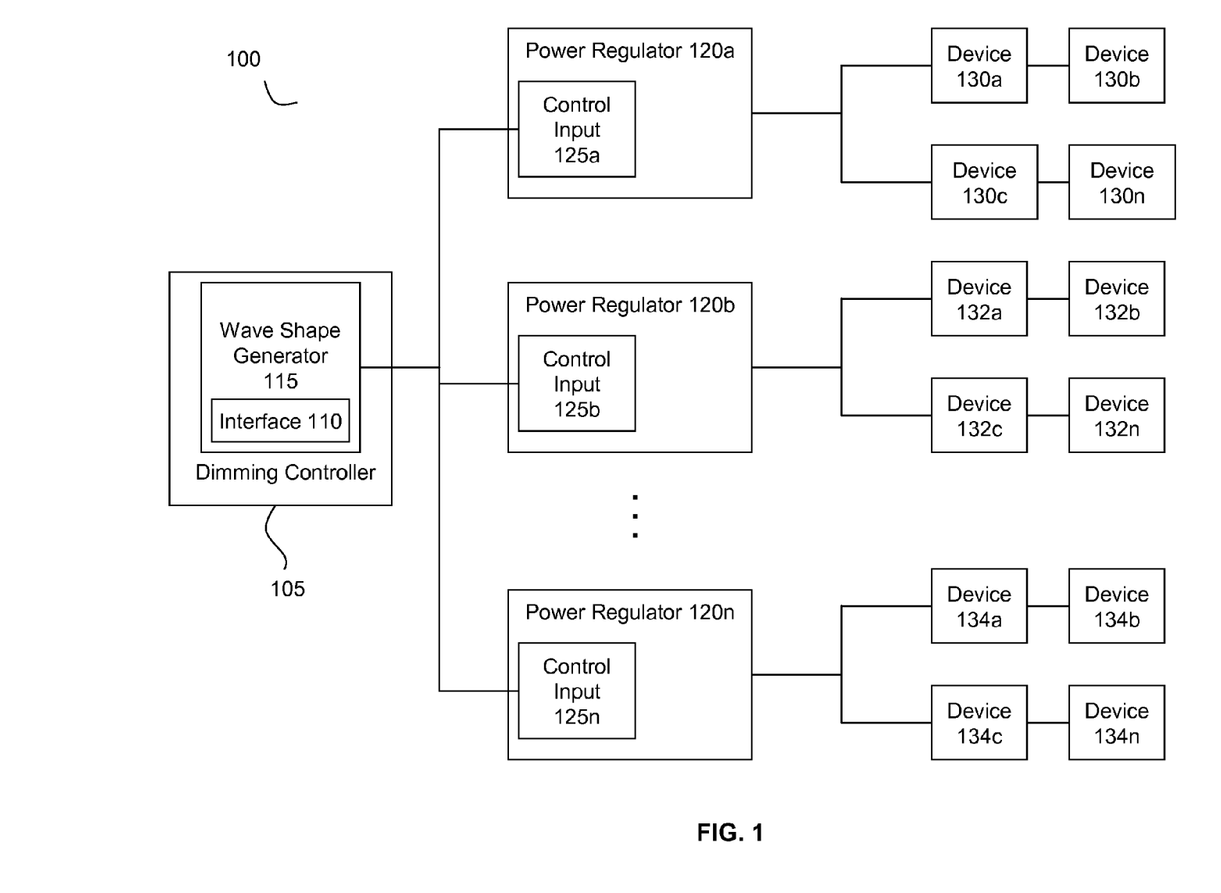
FIG. 1 is a block diagram that depicts an embodiment of a system for providing continuous adjustment of a reference signal to a control chip.

Referring to FIG. 1, a block diagram that depicts an embodiment of a system for managing power provided to a device by continuously adjusting a reference signal to a control chip is shown. In brief overview, and in some embodiments, the system includes a wave shape generator 115 configured to generate or modify a wave that includes a wave shape. In some implementations, the system may include a dimming controller 105 that may receive input from a user indicating a dimming level and indicate, to a wave shape generator 115, a desired dimming level. In some implementations, the system can include one or more power regulators 120a-n that includes a control input 125a-n. An output of the wave shape generator 115 may be coupled to a control input 125a-n of the power regulator 120. In some implementations, the system can include one or more devices 130a-n, 132a-n, 134a-n coupled to the power regulators 120a-n.

The dimming controller 105, wave shape generator 115, and/or power regulator 120 may comprise hardware, software or a combination of hardware (e.g., a processor, memory, cache, and/or input/output devices) and software for controlling the power provided to a device. The dimming controller 105, wave shape generator 115, and/or power regulator 120 may comprise memory and storage for storing information, processor, processing units and logic units, logical circuitry as well as analog and digital circuitry for implementing any functionality described herein. For example, the dimming controller 105 may include any logic circuitry that responds to and processes instructions fetched from a memory unit. The power regulator 120 may comprise functionality to monitor or respond to input signals and regulate an output signal.

In further detail, the system 100 can include a wave shape generator 115. The wave shape generator 115 can comprise one or more circuit components (e.g., resistors, capacitors, inductors, operational amplifiers, wires, transistors, etc.) configured to generate a wave that includes a sloping portion or to modify/condition an incoming signal so it includes a sloping portion. In some implementations, the wave shape generator 115 includes a digital-to-analog convertor or microcontroller, (e.g., a PIC microcontroller) configured to generate a wave that includes a sloping portion. In some implementations, the wave shape generator 115 may include one or more inputs to receive power. In some implementations, the wave shape generator 115 may include one or more outputs to output the generated wave.

Figure 3A:
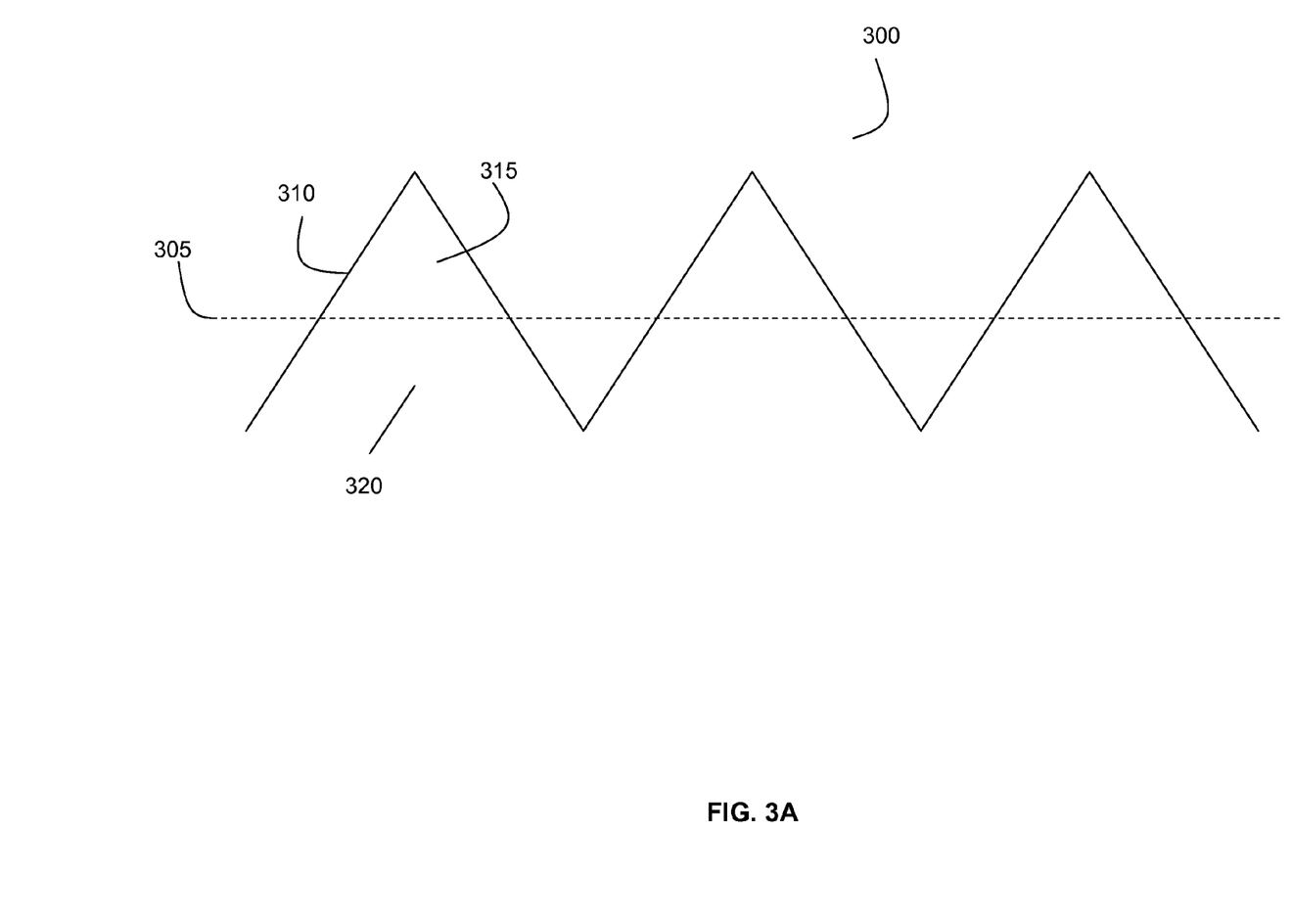
FIG. 3A is an illustrative example of an embodiment of a triangle wave used to provide continuous adjustment of a reference signal to a control chip.
Figure 3B:
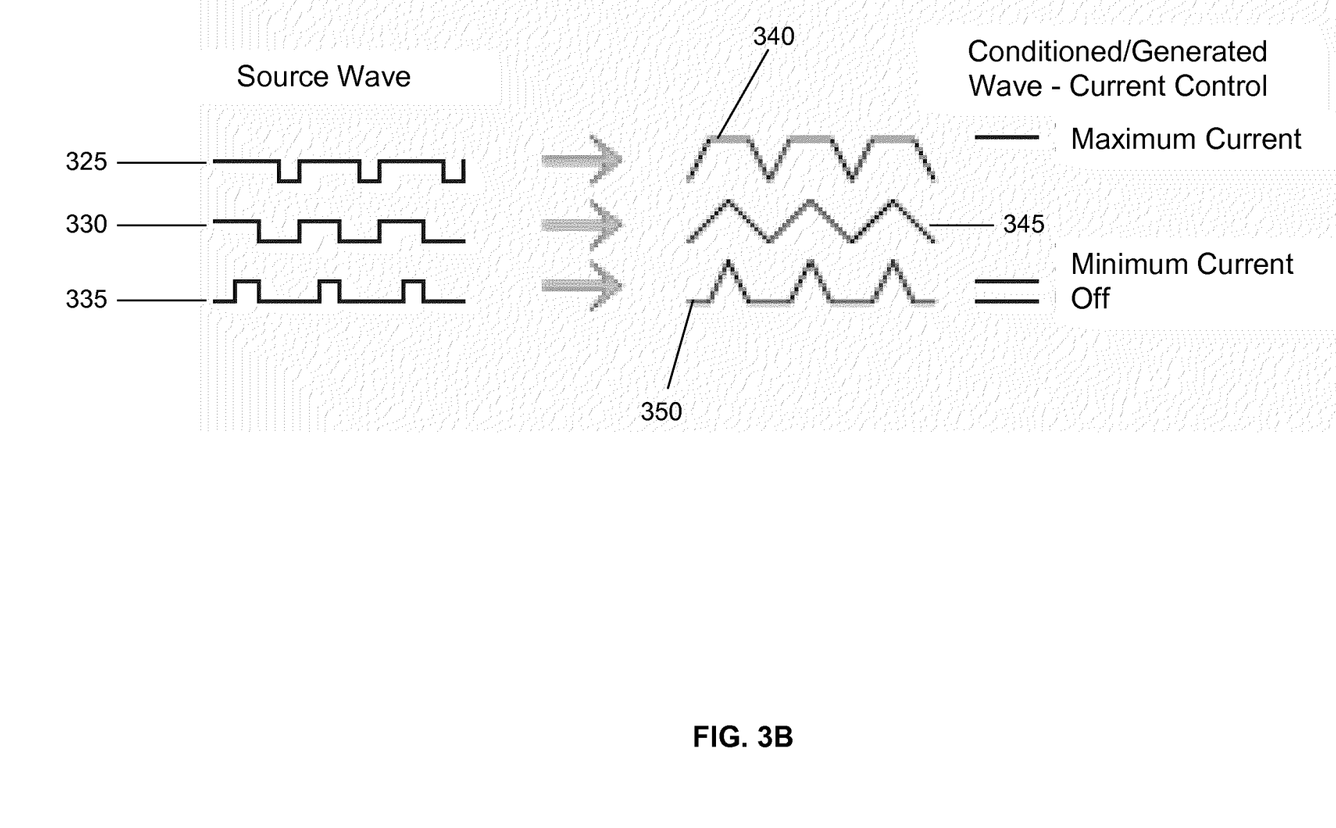
FIG. 3B is an illustrative example of an embodiment of a source wave and corresponding conditioned wave used to provide continuous adjustment of a reference signal to a control chip.

In some embodiments, the wave shape generator 115 can generate one or more wave shapes with a sloping portion using one or more techniques. For example, and as illustrated in FIG. 3B, the wave shape generator 115 may generate a wave without any flat portions (e.g., triangle wave 345), or the wave shape generator 115 may generate a wave that includes at least one portion with a slope and at least one flat portion (e.g., waves 340 and 350). In both embodiments, the wave can include a portion with a slowly changing voltage or current relative to the rise-time of the edges of a square wave. In some implementations, the wave shape generator 115 includes a digital-to-analog converter configured to output a wave whose sloping portion includes a plurality of steps corresponding to the digital to analog conversion.

Figure 2A:
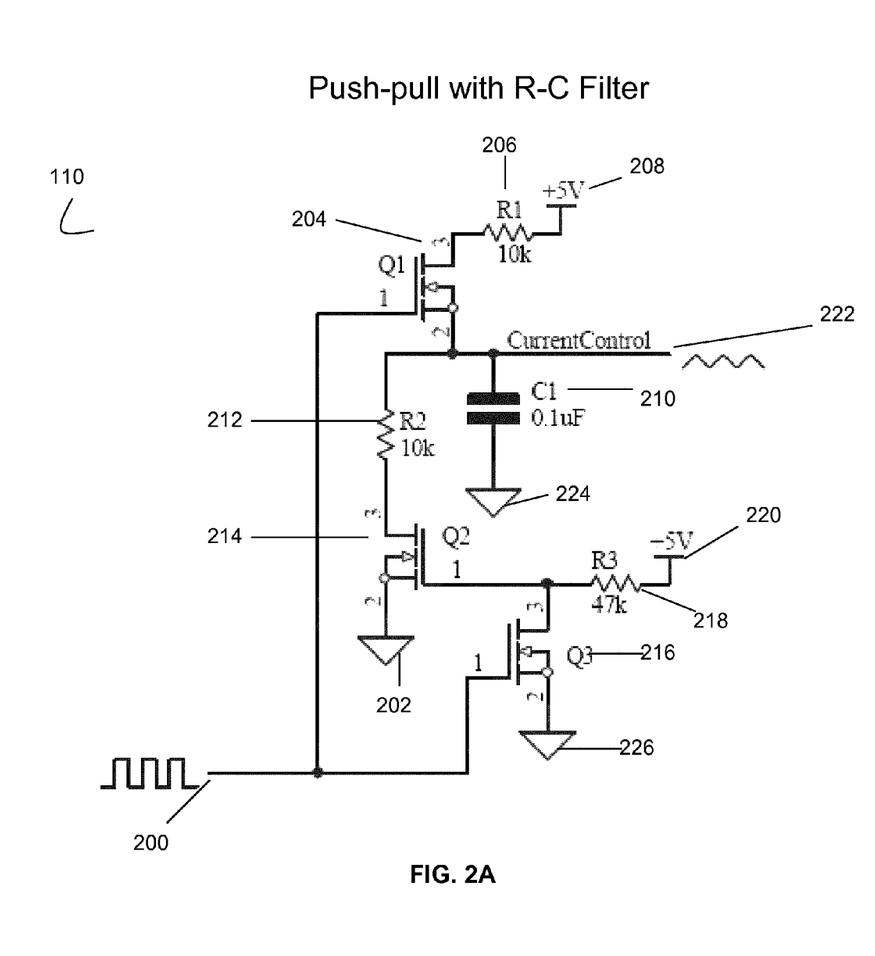
FIG. 2A is an illustrative example of an circuit diagram in accordance with an embodiment for providing continuous adjustment of a reference signal to a control chip.
Figure 2B:
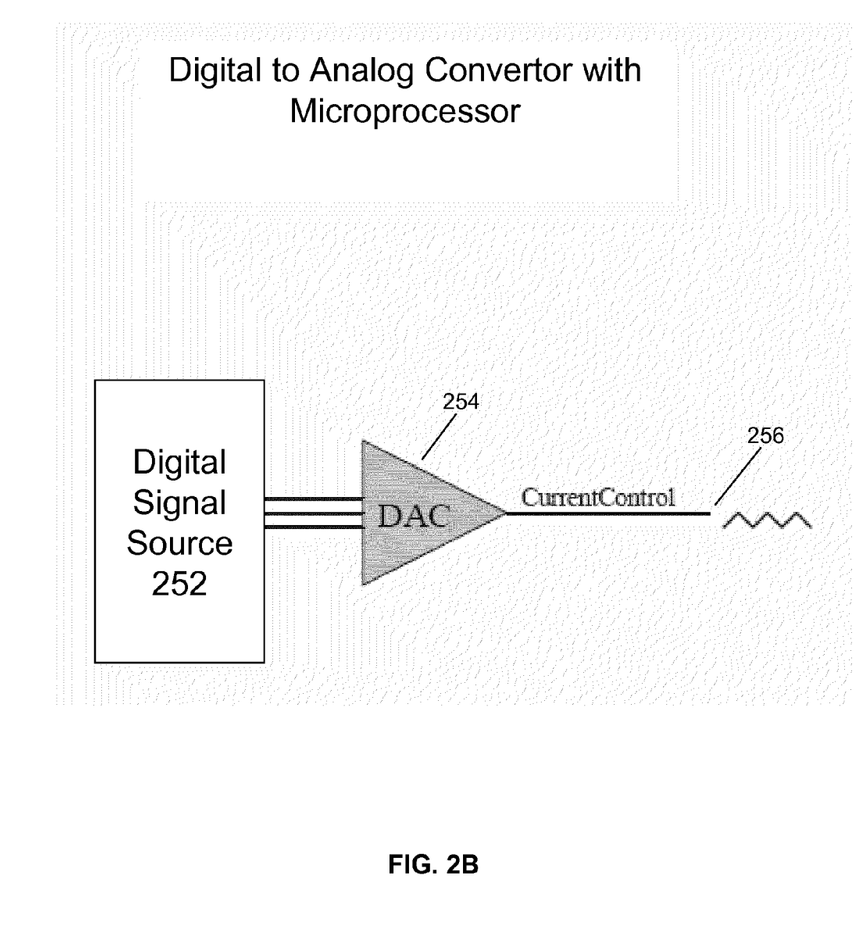
FIG. 2B is an illustrative example of block diagram in accordance with an embodiment for providing continuous adjustment of a reference signal to a control chip.

In some embodiments, the wave shape generator 115 can include an interface 110 configured to condition an incoming signal by, e.g., rounding the edges of a square wave or otherwise modifying an input wave to generate a wave with a wave shape having a slope. In some embodiments, generating a wave with a wave shape having a slope may refer to modifying a source wave via an interface 110. In some embodiments, the interface 110 of the wave shape generator 115 can include at least one of a: transistor push-pull with a Resistor-Capacitor ("R-C"); a transistor "push up" with a resistor pull-down with an R-C; a transistor "pull down" with a resistor pull-up with a Resistor+Capacitor; a constant-current source/constant-current sink with a Capacitor; a constant-current source with a resistor pull-down with a Capacitor; a constant-current sink with a resistor pull-up with a Capacitor; and an inductor and/or a capacitor configured to slow the edges of a square wave. An illustrative example of a push-pull with an R-C filter interface 110 is shown in FIG. 2A, and an illustrative example of a digital-to-analog convertor interface is shown in FIG. 2B.

In some embodiments, the wave shape generator 115 may be pre-configured to output a wave with a predetermined wave shape. In some embodiments, the system 100 can include a dimming controller 105 configured to receive input indicating a desired dimming level and communicate the desired dimming level to a wave shape generator 115. For example, the dimming controller 105 may include a dial, switch, knob or other element a user may interact with to indicate a dimming level. In some embodiments, the dimming controller 105 may include digital circuitry to receive an indication of a desired dimming level and facilitate generation of a corresponding wave.

In some implementations, the dimming controller 105 may be configured to alter the frequency of the wave generated by the wave shape generator 115, increase or decrease the slope of the wave, change the wave shape, or change the DC level of the wave. For example, the dimming controller 105 may alter a source wave provided to the wave shape generator 115 such that it has a higher DC level or shorter/longer duty cycle. For example, a DC source may be coupled to the control input 125 of the power regulator 120 to adjust the area of the wave that is above and below the minimum threshold. In some embodiments, the DC source may be coupled to an input of the wave shape generator 115 to adjust the area of the of the wave that is above and below the minimum threshold.

In some embodiments, the dimming controller 105 or wave shape generator 115 can adjust an aspect of the wave or wave shape based on system feedback and a target intensity level. The system feedback may include, e.g., an aspect of the load (e.g., resistance, power use, current use), the amount of power used by device 130a-n, device 132a-n, the amount of power used by power regulator, power loss, etc. For example, the system 100 may receive an indication of a target intensity level for device 130, or otherwise be pre-configured with a target intensity level for device 130. The wave shape generator 115 can then generate a wave with a corresponding slope, DC offset, or frequency such that the average power provided by power regulator 120 to device 130 is sufficient to realize the target intensity level. The system 100 may observe the effect of the waveform generated by wave shape generator 115; e.g., the system 100 may determine that the intensity level of device 130 is below, above, or at the target intensity level, or that the device 130 is flickering, sputtering, or otherwise not operating in a desired manner. For example, the system 100 may determine the power use of the one or more components of the system 100, determine the intensity of an LED based on light measurements, determine the energy output of an electric motor, or identify another intensity metric of device 130 or average power output by power regulator 120. Further to this example, if the system 100 determines that the intensity level of device 130 is below the desired intensity level, the wave shape generator 115 can increase the DC offset of the waveform, adjust the slope of the waveform, or adjust the frequency of the waveform. In another example, if the intensity level of device 130 is above the target intensity level, the wave shape generator 115 can reduce the DC offset of the waveform, adjust the slope of the waveform, or adjust the frequency of the waveform. For example, the power regulator 120 may provide less current to device 130 responsive to a reduced DC offset in the waveform generated by wave shape generator 115 and provided to the control input 125.

The system feedback may include one or more analog or digital circuitry components. For example, a differential operational amplifier may be configured to determine the difference between an output power, intensity level, or current and a target level. The system 100 can, responsive to the feedback, generate a corresponding waveform.

In some embodiments, the system includes a power regulator 120a-n that includes a control input 125a coupled to an output of the wave shape generator 115. In some embodiments, the system 100 may include a plurality of power regulators 120a-n coupled to the output of the wave shape generator 115. The power regulator 120 may include various inputs, including, e.g., an on/off input and a control input 125. The power regulator 120 may include an output coupled to a device 130, and may be configured to regulate voltage or current provided to device 130. In some embodiments, the power regulator 120 is constructed and designed to operate as a constant-current source. For example, the current supplied by the power regulator 120 may be based on an input reference signal, which may include the wave generated by wave shape generator 115 and received via control input 125. By slowly adjusting the reference signal provided to control input 125, the power regulator 120 may modulate the corresponding output power provided to a device 130.

The power regulator may include an on/off input. In some embodiments, the on/off input of the power regulator may be coupled to a power source that provides a signal that corresponds to "on". In some embodiments, the power regulator 120 includes a control input 125 and is configured to turn on, or output power, responsive to receiving a signal at the control input 125 that is above a minimum threshold. When the signal is below the minimum threshold, the power regulator 120 may be configured to stop sending power to device 130, for example. While in some embodiments a high voltage or current value at the current control pin may turn "on" the power regulator and cause a high current to be output, in other embodiments a low voltage or current value at the current control pin may turn "on" the power regulator and cause a high current to be output. In some embodiments, the power regulator 120 may be configured to modulate the output power receiving a triangle wave or sinusoidal wave at a control input 125 that has a portion below the minimum threshold and a portion above the minimum threshold (as illustrated in FIG. 3A).

In some embodiments, the power regulator 120 may include a control chip, such as, e.g., and LED driver or electric motor driver. For example, the driver may include an LED driver such as a Step-Down LED driver with part number LT3474. Further to this example, the control input 125 may comprise a current control input of the LED driver.

In some embodiments, the power regulator 120 may not include a control input 125 that is not a current control input. To facilitate regulating the output wave of a power regulator 125 that does not include a current control input, the wave generated by the wave shape generator 115 may be summed or multiplied with a current feedback signal and coupled to the control input 125. The current feedback signal may be summed or multiplied with the wave using, e.g., analog circuit components.

In some embodiments, the system 100 may include one or more devices coupled to a power regulator 120. For example, multiple devices 130 may be coupled directly to the power regulator 120a or in a cascading manner. The devices 130 may include LEDs, electric motors, or any other device or fixture that may benefit from the systems and methods disclosed herein.

Referring to FIG. 2A, is an illustrative example of a push-pull output with a resistor-capacitor ("R-C") filter interface 110 of wave shape generator 115 in accordance with an embodiment. A push-pull output, for example, may employ a pair of active devices, such as, e.g., transistors 204 and 214, configured to alternatively supply current to, or absorb current from, a connected load (e.g., resistor 212). For example, transistor 214 may be configured to dissipate or sink current from the load 212 to ground or be a negative power supply. Transistor 204 may be configured to supply or source current to the load 212 from a positive supply 208. In some implementations, the interface 110 may include a symmetrical push-pull where the transistor 204 and 214 are configured to reduce or cancel even-order harmonics to reduce distortion.

The input of interface 110 may include a square wave 200. The interface 110 may include a transistor 204 coupled to a power source 208 via a resistor 206. The gate of transistor 204 may be coupled to the square wave 200. The interface 110 may include a second transistor 214. A source of transistor 214 may be coupled to ground 202, while the drain of transistor 214 may be coupled to the source of transistor 204 via a resistor 212. The gate of transistor 214 may be coupled to a power source 218 via a load 218. Also coupled to the gate of transistor 214 may be a third transistor 216 configured to control the power supplied to gate of transistor 214 in accordance with the square wave input 200. The interface 110 may include a capacitor 210 coupled to the source of transistor 204 and ground 224. The interface 110 may include an output 222 coupled to the capacitor 210.

In operation, the interface, the square wave 200 may switch the state of transistors 204, 216, and 214 from on to off. For example, when the square wave 200 is at a high value, transistor 204 may be in the "on" state and allow current to pass from drain 208 through to the source of the transistor 204, which is coupled to a capacitor 210 and the output 222. Further to this example, a high value for square wave 200 may turn on transistor 216 so the power provided by drain 220 will flow through to source 226, thus switching the state of transistor 214. Accordingly, when transistor 204 is switched on, transistor 204 may supply power to load 212, and when transistor 204 is switched off, transistor 214 may be switched on and supply power to load 212.

The interface 110 of the wave shape generator 115 may be configured with various combinations of analog component (e.g., resistor and capacitor) values in order to generate a wave with a wave shape having a slope. In some embodiments, the wave shape generator 115 may be configured with analog component values to generate a wave with a predetermined wave shape having a slope. In the illustrative example of FIG. 2A, resistors 206, 212 and 218 have values of 10,000 Ohms, 10,000 Ohms, and 47,000 Ohms, respectively, capacitor 210 has a value of 0.1 micro Farads, and the power sources 208 and 220 include +5 Volts.

Referring to FIG. 2B, is an illustrative example of an interface 110 that includes a digital to analog convertor ("DAC") with a microprocessor, in accordance with an embodiment. A digital signal source 252 may provide a digital signal to a DAC 254. The DAC 254 may convert the digital signal to an analog signal. The converted signal may not be smooth; e.g., the converted signal may include a plurality of steps corresponding to the granularity of the DAC 254. For example, a 16-bit DAC may be configured to generate an analog signal with a range of sixteen steps. While the wave corresponding to the converted analog signal may not be smooth, the wave may include a wave shape that corresponds to a slope. For example, the voltage level of the wave may rise from a low value to a high value slower than the rise-time. In some embodiments, the system may include a smoothing circuit coupled to the output of the DAC 254 configured to smoothen the wave.

Referring to FIG. 3A, is an illustrative example of a triangle wave 300 generated by the wave shape generator 115 in accordance with an embodiment. The triangle wave 300 may include a portion with a slope 310. A portion of the triangle wave 300 may be above a minimum threshold 305 to turn on a power regulator 120. The portion of the triangle wave 300 above the minimum threshold 305 may correspond to an area above the triangle wave 315, and the portion of the triangle wave 300 below the minimum threshold 305 may correspond to an area below the minimum threshold 320.

In some implementations, the wave shape generator 115 may increase a DC level of the triangle wave such that the area 315 above the minimum threshold is larger than the area 320 below the minimum threshold. When the triangle wave 300 is above the minimum threshold 305, the power regulator 120 may provide power to a device 130, and when the triangle wave is below the minimum threshold 305, the power regulator 120 may stop sending power to the a device 130. By decreasing the area 315 above the minimum threshold, the average power provided by the power regulator 120 to a device 130 may be reduced. For example, the average power provided to a device may correspond to the ratio of the area 315 to the area 320. For example, the dimming level of an LED 130 may be reduced by decreasing area 315 while increasing area 320, thereby reducing the ratio. In some embodiments, the decrease in minimum current provided to a device may be 10 or 100 times less than the power regulator 120 may be capable of providing based on a square wave being provided to an on/off input or a constant current control. For example, systems and methods of the present disclosure may facilitate dimming an LED from 0.1% to 100%, or even less.

In some embodiments, the wave shape generator 115 may adjust the slope 310 of the triangle wave so it increases at a faster rate or a slower rate. In some embodiments, this may increase or decrease the number of times the power regulator 120 starts/stops sending power to device. In some implementations, there may be a minimum number of times the power regulator can start/stop sending power. For example, if the device is an LED, the minimum number of times the LED may stop sending power may be 100 times in a second. For example, if the LED turns on/off less than 100 times in one second, a human eye or other visual sensor may perceive this as a flicker. By slowly the reducing the intensity from a peak of the triangle wave to below the minimum threshold, the negative effects of flicker may be mitigated because the LED is at a reduced intensity level before it shuts off completely, as opposed to going from a peak intensity level to an off state.

Referring to FIG. 3B, is an illustrative example of source waves 325, 330, 335 provided to a wave shape generator 115 or an interface 110, and corresponding output waves 340, 345, and 350 with a wave shape that includes a slope. For example, source wave 325 and output wave 340 include a flat portion corresponding to the maximum output current. However, while the source wave 325 steps from a minimum off current to the maximum on current in the manner of a square wave, the conditioned output wave 340 ramps up from a low current to a maximum current, and ramps down from the high current to a low current.

Source wave 330 may include a reduced duty cycle as compared to source wave 325. As a result, the area above the minimum threshold of conditioned wave 345 is less than the area above the minimum threshold in conditioned wave 340. Therefore, the conditioned wave 345 may cause the power regulator 120 to provide a lower average power than the conditioned wave 340. In illustrative examples, this may facilitate improved dimming of an LED or control of an electric motor.

Figure 4:
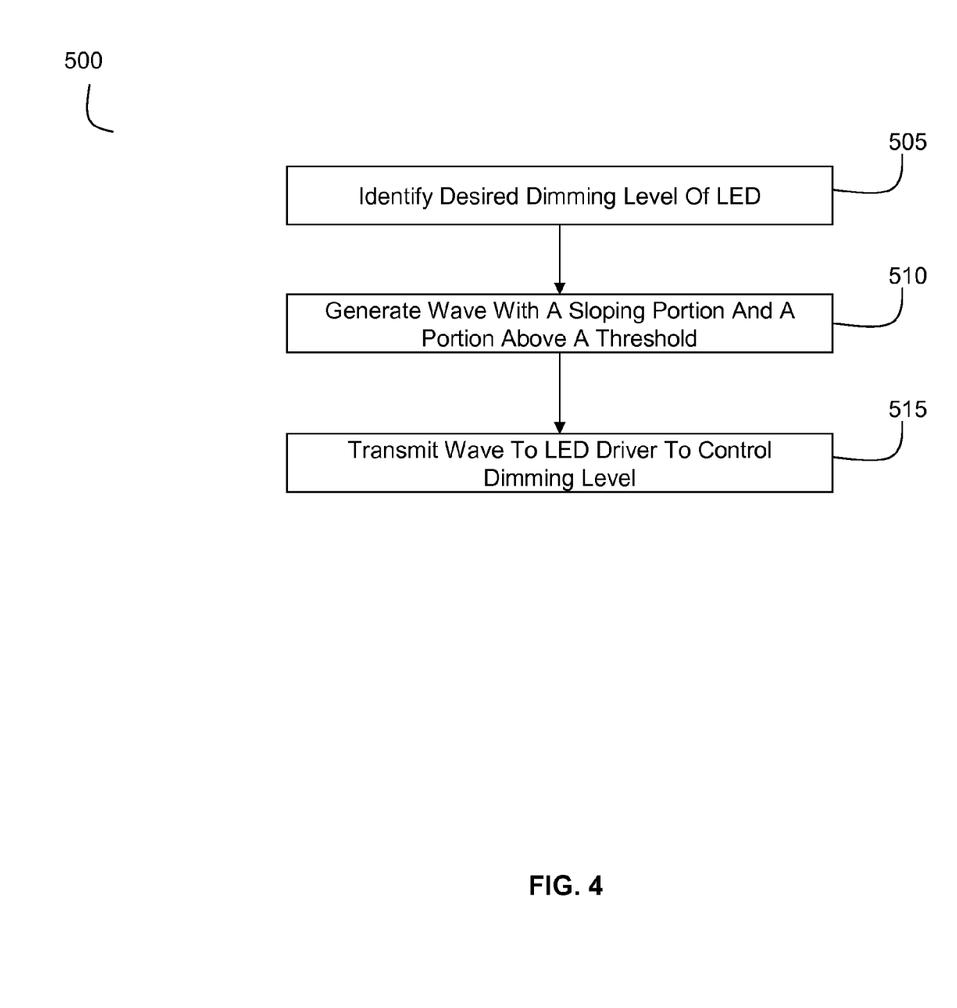
FIG. 4 is a flow chart illustrating steps of a method for providing continuous adjustment of a reference signal to a control chip.

Referring to FIG. 4, is an illustrative example of a method 500 for managing an LED in accordance with an embodiment. In brief overview, the method 500 may identify a desired dimming level for an LED at step 505. At step 510, the method 500 may include generating a wave that includes a ramp or sloping portion. A portion of the wave may be above a minimum threshold to turn on an LED driver. At step 515, the method 500 may include transmitting the generated wave to an LED driver to facilitate controlling a dimming level of an LED.

In further detail, and in some embodiments, the method 500 identifies a desired dimming level at step 505. In some embodiments, the dimming level may be preconfigured, in which case, at step 510, the wave shape and slope may be predetermined. In some embodiments, the method 500 may receive an indication of a dimming level. For example, a user may provide input regarding a dimming level. In some embodiments, the desired dimming level may correspond to a percentage, number, ratio, fraction, power level, etc. For example, the dimming levels may be "high", "medium" and "low".

Based on the dimming level, the method 500 may include generating a wave. The wave may be generated responsive to the dimming level to include a certain wave shape, slope, frequency, or DC level. In some embodiments, at least one of the wave shape, slope, frequency or DC level may be fixed or preconfigured. For example, the wave shape may be fixed to be a triangle or a sinusoid, while the frequency may vary. In some embodiments, the slope may vary while other factors remain the same, thus changing the area under the wave that is above a minimum threshold to turn on a power regulator. Varying one or more of the frequency, slope, DC level, threshold level, or wave shape may facilitate controlling the dimming level of an LED and increasing a dimming range (e.g., 0.1% to 100%).

In some embodiments, the method 500 includes transmitting the wave to a control input to control a dimming level of the LED. For example, the wave may be transmitted to a current control pin of an LED driver. By slowly adjusting the reference signal input to the current control pin, the LED driver may be configured to reduce the average power provided to an LED to reduce the dimming level without causing the LED to flicker.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A system for managing power supplied to a device comprising:
   a power regulator having a first output coupled to a power input of the device, the power regulator configured to control one of a voltage or a current;
   a wave shape generator having an output coupled to a current control input of the power regulator, the wave shape generator configured to generate a wave with a triangular wave shape having a slope, a first portion of the wave being above a minimum threshold to turn on the power regulator, the generated wave provided to the current control input of the power regulator; and
   wherein the power regulator is responsive to the wave and controls an intensity level of the device responsive to the wave shape and the first portion.

2. The system of claim 1, wherein the wave further comprises a second portion being below the minimum threshold to turn off the power regulator and the power regulator is further configured to reduce the intensity level of the device responsive to the second portion.

3. The system of claim 2, wherein at least one of the slope, first portion, and second portion is predetermined based on a desired intensity level.

4. The system of claim 1, wherein the wave shape comprises a voltage changing slower than the rise-time of the wave.

5. The system of claim 1, further comprising a current feedback output coupled to the control input of the power regulator, a signal of the current feedback output being summed or multiplied with the wave.

6. The system of claim 1, wherein the power regulator comprises a light emitting diode (LED) driver, the device comprises an LED, and the intensity level comprises a dimming level of the LED.

7. The system of claim 1, wherein the device comprises an electric motor.

8. The system of claim 1, wherein the wave shape generator is configured to generate at least one of a triangle wave or a sine wave.

9. The system of claim 1, wherein the wave shape generator comprises a digital-to-analog convertor, the wave shape generator further configured to:
   generate the wave shape with a plurality of steps from the digital-to-analog convertor.

10. The system of claim 1, wherein the wave shape generator further comprises an interface, the wave shape generator configured to:
receive a wave from a wave source; and
condition the received wave such that the conditioned wave comprises the slope.

11. The system of claim 10, wherein the interface is configured to round at least one edge of the received wave, the interface comprising at least one of:
a transistor push-pull with a resistor and capacitor;
a transistor push up with a resistor pull-down with a resistor and capacitor;
a constant-current source and constant-current sink with a capacitor;
a constant-current source with a resistor pull-down with a capacitor;
a constant-current sink with a resistor pull-up with a capacitor;
an inductor; and
a capacitor.

12. The system of claim 1, further configured to:
control the intensity level of the device from 1% to 100%.

13. The system of claim 1, further configured to:
control the intensity level of the device from 0.1% to 100%.

14. The system of claim 1, wherein the power regulator is a first power regulator and the device is a first device, further comprising:
a second power regulator having a first output coupled to an input of a second device, and a current control input coupled to the output of the wave shape generator.

15. The system of claim 14, further comprising:
a third device coupled to the first device and the first power regulator in series; and
a fourth device coupled to the second device and the second power regulator in series.

16. The system of claim 1, wherein the power regulator is further configured to:
responsive to the second portion of the wave, stop sending current to the device.

17. The system of claim 1, further comprising a direct current (DC) source coupled to the current control input, the DC source configured to move the second portion of the wave above the minimum threshold.

18. A system for managing a light emitting diode (LED), the system comprising a wave shape generator in communication with a dimming controller, the wave shape generator configured to:
identify, via the dimming controller, a desired dimming level for the LED;
responsive to the indication, generate a wave with a triangular wave shape having a slope, at least a portion of the wave being above a minimum threshold to turn on an LED driver; and
transmit, to a current control input of the LED driver, the wave to control a dimming level of the LED.

19. A method for managing a light emitting diodes (LED), the method comprising:
identifying, by a dimming controller, a desired dimming level for the LED;
generating, responsive to the identification, a wave with a triangular wave shape comprising a slope, at least a portion of the wave being above a minimum threshold to turn on an LED driver; and
transmitting, to a current control pin of the LED driver, the wave to control a dimming level of the LED.

* * * * *